PHOTOELECTRIC METHOD AND APPARATUS

Filed April 15, 1954

INVENTOR
WILLIAM WEST MOE
BY Campbell, Brumbaugh, Free and Graves
HIS ATTORNEYS 2,828,424
Patented Mar. 25, 1958

2,828,424

PHOTOELECTRIC METHOD AND APPARATUS

William West Moe, Stratford, Conn., assignor to Time, Incorporated, New York, N. Y., a corporation of New York Application April 15, 1954, Serial No. 423,318

9 Claims. (Cl. 250—207)

This invention relates generally to photoelectric method and apparatus, and more particularly to method and apparatus of the above-noted character wherein an input signal in the form of light incident on a photoelectric means is converted into modulations of a high frequency carrier at the output of the photoelectric means.

In visual image transference systems as, say, facsimile systems which employ a photoelectric means as, say, a photomultiplier, to convert the light derived from scanned elemental areas of a visual subject into electric signals, it is self-evident, in order to maintain a later faithful reproduction of the visual subject, that a substantially invariable relation be maintained between a significant characteristic, as, say, intensity, of the light signal incident on the photoelectric means and the corresponding characteristic as, say, amplitude, of the electric signal developed by the photoelectric means. Assuming the photoelectric means to be a photomultiplier, it has been found that if the same is run at a usual plate current (as, say, 20 microamperes for the IP21 type of photomultiplier), a serious variance in the above-mentioned relation takes place over a period of time in the presence of a sudden change of incident light intensity from one continuing average level to another. In other words, for this usual value of current if, after, say, a period of darkness, incident light of reference intensity is received by the photomultiplier for a time period, the photomultiplier output signal will assume a given initial amplitude value but will thereafter drift away from this value in a manner deleterious to faithful reproduction of the visual image. The same effect occurs when the photomultiplier after scanning for a period a visual subject of one average tone density, as, say, relatively dark, shifts to scan for a subsequent period another visual subject of different average tone density, as, say, relatively light. Thus, because of this time drift in the photomultiplier output signal, the relation between output signal and input light is subject to distortion which impairs the fidelity of the electric signal representing the visual image.

As a discovery which is part of the present invention, it has been found that if a photomultiplier is operated at a small fraction of its usual current, the mentioned time drift of the photomultiplier can be eliminated for all practical purposes. Operation of a photomultiplier in such manner, however, poses the problem that the available output current from the photomultiplier is extremely small being expressible for low light intensities in terms of thousandths of a microampere. An output signal of this order is completely ineffective to drive a D. C. amplifier for the reason that the D. C. drift occasioned on the first grid of the amplifier by unpredictable factors, such as contact potential, is of such high order relative to the photomultiplier signal that this latter signal will be completely masked by the D. C. drift. The same masking or "washing-out" effect occurs for low photomultiplier current when the photomultiplier output signal in unconverted form is impressed on the mentioned first grid and is thereafter converted for A. C. amplification purposes into modulations on a carrier by, say, varying the transconductance of the first amplifier tube by an A. C. signal.

A potential solution to this problem involves employing means for developing a photomultiplier output signal having an alternating characteristic, and further employing an A. C. amplifier which, because of its nature, will amplify the output signal but not the D. C. drift. For example, it is common in the prior art to employ a mechanical light chopper between the photomultiplier and the scanned visual subject, so that the photomultiplier output signal will be of alternating form. Such chopper, however, is not practical in a high fidelity visual image transference system which requires, say, a twelve kilocycle bandwidth to accommodate the detected variations in detail of the visual subject for the reason that the maximum light interruption rate of the chopper is too slow to carry a twelve kilocycle bandwidth of information. Moreover, a high speed chopper will develop, in the manner discussed below an interfering capacitance current at the photomultiplier output.

Another approach involves converting the light variations incident on the photomultiplier into the form of modulations on a high frequency carrier at the photomultiplier output by supplying a signal of this carrier frequency as an additional input to the photomultiplier, relying on a modulating action in the photomultiplier whereby the carrier frequency input signal is modulated in accordance with the light variations, and extracting from the photomultiplier output a signal so modulated and of the same frequency as the high frequency input signal. This approach is impractical for the reason that the leakage current flowing from the high frequency signal input through the inter-electrode capacitances and residual conductances of the photomultiplier and to the output thereof is so much greater than the information carrying current at this output that the mentioned leakage current completely masks out the information signal.

Yet another approach involves impressing two high frequency signals with separated frequencies on two respective electrodes of the photomultiplier, the theory being that the photomultiplier will yield a mixing type conversion action to provide at its output in modulated form not only the original high frequency signals, but also, to some extent, signals representing the sum and difference frequencies between these original signals. With this mixed frequency output obtaining, the modulated difference signal can be extracted by filter means while the other frequencies are rejected. Such approach, however, is subject to a number of disadvantages. First, a photomultiplier is relatively inefficient as a mixer type of converter with resultant undesirable loss of the useful signal at the photomultiplier output. Second, the scheme discussed requires rather complex filtering components to reject all of the plurality of signals of unwanted frequency appearing at the photomultiplier output. Third, there is an undesirable duplication of oscillators or the like for supplying the two separate high frequency signals to the photomultiplier. Fourth, it has been found, due to shunt capacitance existing between connecting pins and other elements of the photomultiplier, that an interference effect is created between the two high frequency signals to cause a certain amount of non-linearity in the D. C. component of the modulation envelope of the useful output signal.

It is an object of the present invention accordingly to provide new and improved photoelectric conversion method and apparatus which are free from the above-noted deficiences.

Another object of the invention is to provide new and improved photoelectric conversion method and apparatus whereby photoelectric conversion is attained in substantially a drift-free manner.

A further object of the invention is to provide photoelectric method and apparatus by which the output signal of the photoelectric conversion may be effectively segregated from extraneous signals.

A still further object of the invention is to provide method and apparatus by which the above-noted conversion may be carried out with high efficiency and in a linear manner.

Yet another object of the invention is to provide method and apparatus of the above-noted character utilizing, respectively, a minimum number of steps and a minimum number of circuit components.

These and other objects of the invention are attained by providing photoelectric means having electrode means, the voltage of which is varied at a single significant frequency to cause an operating parameter of the photoelectric means to vary in a manner representing a harmonic of said significant frequency other than the harmonics originally contained to any extent by the waveform of the variation of the electrode means. The mentioned variance of said operating parameter causes to be developed at an output of said photoelectric means a modulated high frequency signal wherein the modulation represents the variation of light incident upon said photoelectric means and wherein the carrier corresponds to the mentioned operating parameter variation. This modulated high frequency signal is separated from extraneous signal components which may be present at the mentioned output by filter means adapted to pass substantially only the mentioned high frequency carrier and side bands thereof.

As an important feature of the invention, there is provided a mode of operation for the photoelectric means wherein the same operates at a fraction of its usually employed current.

As another feature of the invention, additional means are provided for opposing at the mentioned output the mentioned extraneous signal components.

As another feature of the invention, yet additional means are provided for varying the voltage of the mentioned electrode means in a mode which is free from the frequency components passed by said filter means.

The invention may be better understood from the following detailed description of a typical embodiment thereof taken in conjunction with the accompanying drawings, in which.

Figures 1, 2, 3:
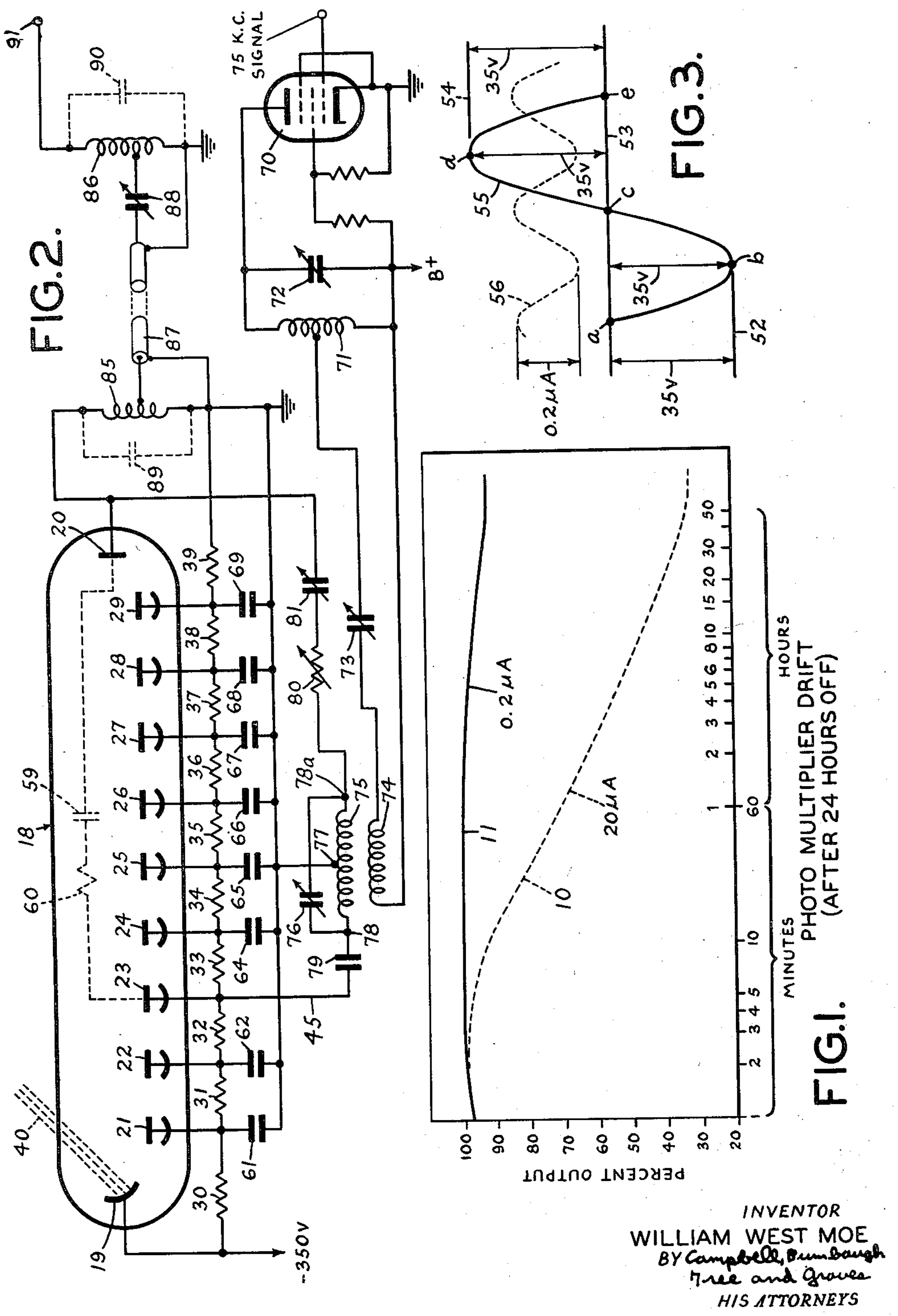
Fig. 1 is a diagram showing the time drift of a typical photomultiplier.
Fig. 2 is a schematic diagram of a photomultiplier circuit illustrating the present invention.
Fig. 3 is a diagram explanatory of a mode of operation of a photomultiplier in accordance with the present invention.

Referring now to Fig. 1, there is shown a graph of photomultiplier output signal versus time, the horizontal coordinate of the graph representing time in minutes and hours on a logarithmic scale, and the vertical coordinate of the graph representing percentage output signal on a linear scale. The graph of Fig. 1 assumes that the photomultiplier to which the graph refers has been turned off for 24 hours and is then turned on to be exposed to light of reference intensity for the whole period of time considered. In the graph of Fig. 1, the dotted line 10 represents a commonly used operating condition for a photomultiplier such as the IP21 (manufactured by the Radio Corporation of America) wherein the photomultiplier draws 20 microamperes current, whereas the solid line 11 represents, as a feature of the present invention, an operating condition wherein the photomultiplier draws only a small fraction of the current commonly used for it. Thus, as shown in Fig. 1, the line 11 may represent .2 microampere current, this value being only 1/100 of the commonly used 20 microampere current represented by line 11.

As shown in Fig. 1, when the photomultiplier after a 24 hour rest is turned "on," the photomultiplier "warms up" so that both the 20 and .2 microampere operating conditions have hundred percent output signal value at the two minute mark. Thereafter, however, the two operating conditions diverge, the output signal for the 20 microampere condition falling rapidly with time despite the continuing light input of constant intensity to the photomultiplier. For the .2 microampere condition of line 11, however, the falling off of output signal is negligible over the first hour (being less than ½ of 1% during this time) and is relatively insignificant over the remainder of measured time as compared to the pronounced falling off for the 20 microampere condition.

Considering the performance characteristics of a photomultiplier in relation to the equipment with which it is to be used as, say, a color facsimile system, the over-all fidelity of the system in reproducing an original colored visual subject must be kept within 2% under the most unfavorable reproduction condition since under such condition any greater distortion is noticeable to the human eye. The figure of 2% is given for the most unfavorable reproduction condition to assure under all conditions, favorable or unfavorable, that the necessary quality of reproduction is maintained. It follows that from the beginning to the end of a scanning period which cannot be interrupted to recalibrate the photomultiplier, the permissible drift of the output current thereof cannot exceed 2% under the most unfavorable operating conditions for the photomultiplier.

The photomultiplier of the present invention is adapted for use with a color facsimile system (as is, for example, disclosed in applicant's co-pending U. S. application, Serial No. 251,898, filed October 18, 1951) which may take approximately an hour to fully scan a given visual subject such as a photographic color transparency. During this hour time period, the photomultiplier cannot be recalibrated to correct for a change in the ratio, input light/output current (although the photomultiplier can be recalibrated between scannings to correct for such ratio change). Accordingly, the limiting acceptable performance of the photomultiplier may be defined as one in which under the most unfavorable operating conditions the output current does not drift more than 2% per hour, the stated performance being critical in that it marks the breaking point between satisfactory and unsatisfactory results with regard to visual image reproduction. As described, the factor determining whether this criterion of performance is satisfied is the amount of photomultiplier current, the .2 microampere current for the IP21 giving, as shown in Fig. 1, results well within the permissible range of drift.

To enlarge on what is meant by the most unfavorable operating condition for the photomultiplier, it is evident from Fig. 1 that the largest drift occurs when the current through the photomultiplier is at its maximum in the sense that it represents the maximum intensity of light which is directed on the photomultiplier in a particular application thereof for photoconversion purposes. Also, as shown in Fig. 1, the greatest drift of the current away from its initial stabilized value after "warm-up" (this initial stabilized value existing at the two minute mark in Fig. 1) occurs during the first hour of operation after the photomultiplier has been rested for a sufficient period (as, say, the 24 hour period preceding the measurements graphed in Fig. 1) so that the photomultiplier has substantially recovered from its "fatigue" induced by long exposure to light and manifested by the described drift of output signal. If the photomultiplier has only rested 12 hours so that it has not completely recovered from fatigue, the initial stabilized current will, for the same reference light intensity, be less than that represented in Fig. 1, but the percent drift away from this initial value will also be less over the first hour of operation. Thus, the most unfavorable operating conditions for the photomultiplier are (1) where the photomultiplier current represents the maximum light intensity employed, and (2) during the first hour of operation following full recovery of the photomultiplier from light fatigue.

It has been discovered as a part of the present invention that if the photomultiplier current used is sufficiently low to eliminate, as described, the distortion effect of "long-time" drift, the current also eliminates another undesirable phenomenon which may be denoted "short-time" drift. Assuming that scanning takes place in the form of vertically displaced horizontal lines, "long-time" drift manifests itself as a gradual change in tone of a reproduced visual subject in the vertical direction. Short-time drift, however, manifests itself in the situation where for the major portion of a horizontal scan the photomultiplier receives light of one average intensity and then for the rest of the scan receives light of a widely different average intensity. For high output current, due to an apparent "self sensitizing action" of the photomultiplier, the ratio input light/output current undergoes (following the abrupt change in average tone density) a rapid change in value exceeding that permissible for faithful reproduction. Translated into terms of the reproduced image, short-time drift will accordingly cause noticeable streaking of the reproduced visual subject in the horizontal direction. By use of the low photomultiplier current described, however, this undesirable streaking is avoided.

Although Fig. 1 represents the results of tests on a given photomultiplier, it has been found that for photomultipliers generally the percent amount of drift per given time period is commensurate with the amount of photomultiplier current. It is thus evident that to satisfy the exacting requirements of a high fidelity image transference system it is desirable to use with photomultipliers generally no more current than that which, as described, yields the limiting acceptable drift characteristic for the photomultiplier used.

As stated heretofore where a photomultiplier operates to draw current only on the order of .2 microampere, it is impractical to amplify the photomultiplier output signal by D. C. means for the reason that the extraneous voltages and currents on the grid of the first amplifying tube are of such greater order than the output signal that they completely obscure the same. This fact will be better appreciated when it is considered, first, that the given .2 microampere value represents the upper limit of the photomultiplier current for the employed operating condition, the current actually varying within the range from 0 to .2 microampere, and, second, that this .2 microampere range must be subdivided into 500 independently resolvable units of current in order to effect a photoelectric conversion with the desired fidelity in representing fine shadings of tone density on the visual subject. Thus, in order to obtain the fidelity required, it is necessary that two photomultiplier output currents differing from each other only by .0004 microampere be resolvable from each other as representing different visual information. It will be seen accordingly that an A. C. amplification technique is a necessary concomitant to low current photomultiplier operation of the sort described.

With regard to a mode of obtaining A. C. amplification free of interfering cpacitance current and other disadvantages heretofore discussed, reference is made to Fig. 2, wherein there is shown a photomultiplier 18 including a photosensitive cathode 19, an anode 20 and a plurality of dynodes 21—29. The photomultiplier 18 may be of the IP21 type. To provide D. C. operating voltage for the photomultiplier, the anode 20 is D. C. coupled to ground while the cathode 19 is coupled to a suitable source of negative voltage supply (not shown). In the present instance, to obtain photomultiplier plate current of the desired low value (on the order of .2 microampere), the negative voltage supply is maintained at —350 volts rather than —600 volts or more which is usual for the IP21.

D. C. potentials for the several dynodes 21–29 are provided by a voltage divider circuit connected between ground and the —350 volts supply and comprising the series connected resistors 30–39, the several dynodes being connected in order to respective junction points between adjacent resistors. By the connections described, there is produced within photomultiplier 18 a D. C. field between cathode 19 and dynode 21, a D. C. field between each dynode and the next dynode on its right, and a D. C. field between dynode 29 and anode 20, the several D. C. fields being all directed to accelerate electrons from the cathode to one after another of the dynodes and then to the anode 20. Note that since there are 10 equal resistors 30—39 subdividing the 350 volt operating potential, that each D. C. field has a 35 volt value, rather than the usual higher value for an IP21 which may be as great as 100 volts per field. This low voltage for each photomultiplier field is the cause of the low operating current thereof, the operating current being roughly a function of the voltage of each D. C. field raised to an exponent commensurate with the number of fields.

As is well known, when a variable intensity light beam 40 derived from, say, scanning of elemental areas of a visual subject, falls upon photosensitive cathode 19, the cathode emits electrons in accordance with the light beam variations. These emitted electrons are accelerated by the the D. C. field between cathode 19 and dynode 21 to strike this dynode at a velocity causing secondary emission therefrom of more electrons than there are incident electrons on the dynode, the number of secondary electrons, however, varying commensurately with the number of primary electrons. The electrons secondarily emitted from dynode 21 are in turn accelerated by the D. C. field between dynodes 21, 22 to strike dynode 22 at a velocity causing secondary emission therefrom in the same manner as for dynode 21. Accordingly, for the several D. C. fields between cathode 19 the various dynodes and anode 20, the secondary emission action is cumulative to provide at anode 20 an electric signal varying in accordance with the light variations on cathode 19, but of much greater energy than is characteristic of the light variations.

The electric output signal at anode 20 is, as described up to now, essentially a fluctuating D. C. signal. To impress an alternating characteristic upon the output signal, an oscillatory signal, produced in a manner later described, is applied via a lead 45 upon one of the photomultiplier dynodes as, say, the third dynode 23. The presence of this oscillatory signal upon a given photomultiplier dynode causes the two D. C. fields terminating on the given dynode to vary oppositely in an alternating manner at the frequency of the applied oscillatory signal. The variation of these electric fields in turn causes a variation in the photomultiplier electron stream current at a rate composed essentially of harmonics of the oscillatory signal frequency, particularly including a very strong second harmonic thereof. For example, if a 75 kc. oscillatory signal is impressed on dynode 23, the current carried by the electron stream will vary pronouncedly at a 150 kilocycle rate. This high frequency variation of electron stream current in turn creates at anode 20 an output signal taking the form of a high frequency carrier, as, say, a 150 kilocycle carrier modulated in a manner representing the light variations detected by cathode 19. For a high speed visual image transference system, the light variations may occupy a 12 kilocycle band width. Thus, at anode 20, the desired output signal may be considered to be the 150 kilocycle carrier plus side bands extending through a twelve kilocycle band width.

For a better understanding of how the mentioned modulated high frequency signal is obtained, reference is made to the diagram in Fig. 3 wherein the horizontal and vertical coordinates represent, respectively, time and voltage (or current) and wherein the solid lines 52, 53, 54 and 55 represent, respectively, the D. C. voltage levels on the dynodes 22, 23, 24 and the A. C. voltage on dynode 23 over a single cycle. The dotted line 56 represents the electron stream current variation in the presence of the mentioned A. C. voltage. As shown, the dynodes 22, 24 are maintained 35 volts D. C. below and above, respectively, the dynode 23 while the A. C. wave on this latter dynode is shown as having a 35 volt peak amplitude so that at the trough of each cycle, dynode 23 drops to the voltage of dynode 22 and at the crest of each cycle, dynode 23 rises to the voltage of dynode 24. This condition wherein the peak amplitude of the impressed A. C. equals the difference in D. C. voltage between the varying dynode and the dynodes on either side thereof represents the optimum operating condition for the photomultiplier to effect a conversion to alternating form of the signal thereof.

At the start of a cycle designated by point *a*, when the A. C. signal is zero, the voltage relations between dynodes 22, 23, 24 will be the same as if no A. C. signal were present. Accordingly, the electron stream current will have its maximum value of, say, .2 microampere (an input signal in the form of light of the maximum intensity used being assumed for the photomultiplier). At the quarter mark in the cycle designated by point *b*, the instantaneous voltage on dynode 23 drops to the D. C. level of dynode 22. Accordingly, at this quarter mark no electron accelerating field will exist between dynodes 22 and 23 with the result that the electron stream is completely interrupted between these dynodes. It follows that a simultaneous interruption occurs of the electron stream current through photomultiplier 18 as a whole, the output current thereof dropping at this time to zero as shown by line 56. A similar effect occurs at the three-quarter cycle mark designated by point *d*, when by the instantaneous voltage rise of dynode 23 to the D. C. level of dynode 24 the accelerating field between these dynodes is reduced to zero with the result that the photomultiplier output current is again reduced to zero. At the half-way and end marks of the cycle, designated by points *c* and *e*, since the A. C. signal is of zero value, the electron stream current at these times is restored to its initial value of .2 microampere. Intermediate the considered times of the A. C. cycle, the values of the A. C. signal determine values of the electron stream current intermediate between maximum and minimum in a manner so that the electron stream current variation assumes, as shown, a substantially sinusoidal form, the major component of the electron stream current variation being the second harmonic of the fundamental of the A. C. signal.

Since, for the assumed voltage values, the electron stream current is twice in an A. C. cycle reduced completely to zero and twice in an A. C. cycle restored to its fully steady state value, it will be seen that in the presence upon one of its dynodes of an oscillatory signal having a peak amplitude equalling the D. C. voltage between adjacent dynodes, that a photomultiplier tube will act as a highly efficient frequency doubler. The same effect is obtained, although not with optimum efficiency, if the peak amplitude of the A. C. signal is greater or less than the D. C. voltage between dynodes. The choice of the dynode upon which the A. C. signal is impressed is not critical. Also, if desired, A. C. signals of the same frequency may be impressed on more than one dynode, although it is advisable for best frequency doubling effect that the dynodes so used not be adjacent each other.

The variations of electron stream current shown by line 56 in Fig. 3 represent a high frequency carrier of say, 150 kilocycles (when the dynode A. C. signal is 75 kilocycles) upon which is impressed in the form of modulation the variations in light intensity detected at cathode 19 (Fig. 2). This modulated high frequency carrier appears at anode 20 where it is passed through a band-pass filter means, hereafter more fully described, the filter means being adapted to transfer therethrough the carrier and modulation side bands thereof, but being highly rejective of all frequencies outside the pass band of the filter means.

As stated heretofore, one of the basic problems in obtaining a useful A. C. photomultiplier output signal is the elimination of the "washing-out" effect at the output caused by extraneous leakage currents, such as currents conveyed by the inter-electrode capacitances of the photomultiplier. Every photomultiplier or other photoelectric tube is characterized to some extent by inter-electrode capacitance and residual conductance existing between the connecting pins and other tube elements and represented in Fig. 2 by the symbolic capacitor 59 and the symbolic resistor 60. As shown in Fig. 2, this inter-electrode capacitance and residual conductance furnishes a path for flow of current from the dynodes as, say, the dynode 23, to the anode 20, and although the value of this inter-electrode capacitance and residual conductance is in absolute terms quite small, nonetheless, the A. C. current conveyed therethrough in the presence of high frequency A. C. signals on the dynodes is vastly larger in relative terms than the useful output current on the anode of the photomultiplier when the same is operated in the low current, drift-free manner hitherto described. Thus, the leakage current (meaning the inter-electrode capacitance and residual conductance current) must be separated at the photomultiplier output from the electron stream current to avoid a washing-out of the latter current by the former. If the high frequency carrier of the photomultiplier output signal has a major component of a given frequency and the oscillatory input signal on a dynode has any substantial amount of component of the same given frequency, the segregation of this given frequency component as conveyed to the anode by the electron stream from the frequency component of the same frequency as conveyed to the anode by leakage current is well nigh impossible, and a washing-out of the useful photomultiplier signal results. Note, however, in the circuit of Fig. 2 that the high frequency carrier at anode 20 developed by the electron stream current is at 150 kc., whereas the oscillatory signal impressed on dynode 23 is composed substantially entirely of the 75 kc. fundamental. Accordingly, even though a 75 kc. signal of strong amplitude relative to the useful photomultiplier output signal arrives by leakage at the anode 20, the band-pass filter means thereat, being of highly discriminatory characteristic, will reject substantially entirely the 75 kc. extraneous signal while transferring substantially entirely the desired 150 kc. information signal.

As a further measure to eliminate appearance of the 75 kc. leakage signal at anode 20, there may be employed the by-pass capacitors 61, 62 and 64–69 coupled between ground and, respectively, the dynodes 21, 22 and the dynodes 24–29. Of these by-pass capacitors, the capacitors 61, 62, 64 and 65 are the most important, being closest in terms of the voltage dividing series of resistors 30–39 to the dynode 23, the source of the undesired leakage current.

In view of the foregoing it will be evident that if the high frequency carrier at anode 20 represents a given harmonic as, say, the second harmonic of the fundamental of the oscillatory signal on dynode 23, that in order to prevent wash-out, the oscillatory signal itself must be pure in the sense that it is free of this given harmonic. Such pure oscillatory signal may be obtained, as shown in Fig. 2, by amplifying a substantially pure input signal of the desired fundamental as, say, 75 kc. with an amplifer tube 70 (which may be a 6V6) having as a plate load a parallel resonant circuit tuned to the fundamental and composed of the inductance 71 and variable capacitor 72. The resonant signal appearing across part of inductance 71 is supplied to a series resonant circuit also tuned to the fundamental and composed of variable capacitor 73 and inductance 74. Inductance 74 is inductively coupled by a loose air coupling with another inductance 75, the inductances 74 and 75 forming in effect the primary and secondary of an air core transformer. By such use of an air core coupling, there is avoided the distortion which would be caused in the signal induced in inductance 75 by the use of iron cores.

For further suppression of undesired harmonics a variable capacitor 76 is shunted across inductance 75 to form a tuned circuit therewith tuned to the desired 75 kc. fundamental. The center point 77 of inductance 75 is coupled to ground to provide a push-pull relation between the voltages induced in the inductance to either side of this center point. One end point, 78, of inductance 75 is coupled through a capacitor 79 to dynode 23 to impress the 75 kc. oscillatory signal on the dynode. The opposite end, 78*a*, of inductance 75 is coupled through a variable resistor 80 and a variable capacitor 81 in series (both elements being of small current-carrying value) to the anode 20. It will be recognized that the signal fed from point 78*a* to anode 20 will be opposite in phase to the signal reaching this anode via leakage capacitor 59 and leakage resistor 60, a neutralizing circuit being formed. Accordingly, by adjusting, in a well-known manner, the values of resistor 80 and capacitor 81, any residual 75 kc. signal at anode 20 may be largely cancelled out by a neutralizing action, the neutralizing action thus being a valuable adjunct to the discriminatory action of the filter means against this 75 kc. signal.

While any appropriate high Q band-pass filter means may be used, in accordance with the present invention, the filter means disclosed by the embodiment of Fig. 2 takes the form of an inductance coil 85 and an inductance coil 86 which have tap points thereon (near the grounded ends of the inductances) coupled together through a shielded cable 87 and variable capacitor 88 in series. Both the inductance coils 85, 86 have residual capacitances associated therewith represented, respectively, by the symbolic capacitors 89 and 90. The coils 85 and 86 are selected to be resonant at approximately 150 kc., the mid-frequency of the useful photomultiplier signal. Variance in the band width of the filter may be accomplished by varying the value of capacitor 88.

The described organization of coils 85, 86 and the coupling therebetween is the equivalent, from the point of view of electrical performance, to a double tuned, intermediate frequency air core transformer as is commonly used in radio receiving circuits. Looking from anode 20, the coil 85 presents a high impedance to ground, this high impedance being necessary for optimum signal output in view of the high internal impedance of photomultiplier 18. Coil 86 also presents a high impedance between ground and the output terminal 91 for the circuit. By connection of cable 87 and capacitor 88 to tap points near the ground connections of the coils, however, a high/low impedance transformation is obtained between coil 85 and cable 87, while a low/high impedance transformation is obtained between capacitor 88 and coil 86. Thus, a low impedance is seen looking from the tap point of coil 85 into cable 87, this low impedance being desirable when, as is often the case, the coil 86 is separated from coil 85 by some distance in the equipment in which the photomultiplier is employed.

The cable 87 and capacitor 88 may be considered to replace the usual loose air core coupling in a double tuned, I. F. transformer having coupled resonant circuits equivalent to coils 85 and 86. Thus, coils 85, 86 and their couplings provide between anode 20 and output terminal 91 a filter means having the well-known "double hump" or "flat top" frequency response characteristic centered on the mid-frequency of the modulated high frequency signal at anode 20. The described frequency response characteristic provides a sufficient pass band to accommodate a twelve kc. band width for the modulations impressed on the 150 kc. carrier.

The method and apparatus of the present invention provide a multiplicity of advantages in that they overcome the disadvantages heretofore mentioned of the other described approaches for obtaining photoelectric conversion with an alternating output signal. In addition, it should be specifically mentioned that the method and apparatus of the present invention have been found to provide a sensitivity of photoelectric conversion between light input and electric signal output representing an estimated ten-fold improvement over the approach where conversion is effected by impressing, as hitherto described, A. C. signals of two separate frequencies upon separate dynodes of the photomultiplier. It has also been found that by the method and apparatus of the present invention the output signal on terminal 91 (Fig. 2) is so free of noise and other extraneous signals that the only limiting factor in further distortion-free amplification of the signal is the signal/noise ratio of the amplifying means itself.

It will be understood that the method and apparatus described above and disclosed through the drawings are susceptible of numerous modifications in form and detail within the spirit of the invention. For example, while the invention has been specifically described in terms of producing electron stream current variations which are the second harmonic of the fundamental of the oscillatory signal inducing the variations, it is within the spirit of this invention to produce current variations at a harmonic rate other than the second harmonic of the mentioned fundamental and to use a filtering means or action selectively tuned to this other harmonic, providing, of course, that the oscillatory input signal itself has a negligible content of this other harmonic. Also, while the present invention has been described for primary application in a facsimile system, it is evident that the invention is also of useful application with other visual image transference systems as, say, television systems, or with light measuring devices as, say, densitometers, and in fact, in all applications where stability and fidelity of photoelectric conversion are significant criteria of performance. Therefore, the invention is not to be thought of as restricted to the embodiment shown, but rather as broad as the scope of the following claims will permit.

I claim:

1. The method of operating a photomultiplier comprising the steps of, varying in opposite phase in an alternating manner and at only one fundamental frequency, free of second harmonic, the voltage in said photomultiplier of at least two adjacent electron-accelerating inter-electrode fields having substantially equal D. C. voltage components to reduce said voltages alternately to at least zero value at times a half cycle apart in a voltage variation cycle, the said varying of said voltages effecting a cyclical driving of the electron-carried anode current of said photomultiplier through the maximum in said current obtainable from said voltages to produce in said current, a variation having as a major component the second harmonic of said fundamental frequency, and filtering said anode current to pass signals of said second harmonic frequency along with side band frequencies thereof and to reject signals of other frequencies.

2. The method of operating a photomultiplier comprisprising the steps of, varying in opposite phase in an alternating manner and at only one fundamental frequency the voltages of at least two adjacent electron-accelerating inter-electrode fields in said photomultiplier back and forth through the maximum value obtainable from said voltages in the electron-carried anode current of said photomultiplier, the said varying of said fields producing in said current a variation having as a major component the second harmonic of said fundamental frequency, said adjacent fields having substantially equal D. C. voltage components and said voltage variations being substantially free of said second harmonic, and filtering said anode current to pass signals of said second harmonic frequency along with side band frequencies thereof and to reject signals of other frequencies.

3. A method as in claim 2 wherein the peak amplitude of said voltage variations substantially equal the D. C. voltage components of said inter-electrode voltages to accordingly reduce said voltages substantially to zero at times a half cycle apart in a voltage variation cycle.

4. The method of operating a photomultiplier comprising, producing therein an electron-carried anode current of sufficiently low value for the maximum light intensity used to limit the drift of said current to at the most 2% per hour during the first hour of operation following substantially full recovery of said photomultiplier from light fatigue, cyclically varying in opposite senses and at only one fundamental frequency the voltage of at least two electron-accelerating inter-electrode fields in said photomultiplier to produce in said electron-carried anode current a variation having as a major component a harmonic of said fundamental frequency other than harmonics present to a substantial extent in said voltage variations, and filtering said anode current to pass signals of said current variation frequency along with side bands thereof and to reject signals of other frequencies.

5. The method of operating a photomultiplier comprising, producing therein an electron-carried anode current of sufficiently low value for the maximum light intensity used to limit the percentage drift of said current to a negligible amount during the first hour of operation following substantially full recovery of said photomultiplier from light fatigue, varying in opposite phase in an alternating manner and at only one fundamental frequency the voltage of at least two electron-accelerating inter-electrode fields in said photomultiplier to produce in said electron-carried anode current a variation having as a major component the second harmonic of said fundamental frequency, said voltage variations being substantially free of said second harmonic, and filtering said anode current to pass signals of said second harmonic frequency along with side band frequencies thereof and to reject signals of other frequencies.

6. In a photoelectric conversion system including a photomultiplier having an anode and dynodes, the combination with said system comprising means for producing in said photomultiplier an electron-carried anode current of sufficiently low value for the maximum light intensity used to limit the drift of said current from its initial stabilized value to at the most 2% during the first hour of operation following substantially full recovery of said photomultiplier from light fatigue, and means for converting said electron-carried current at said anode into the form of a high frequency carrier modulated in accordance with the variations in intensity of the light detected by said photomultiplier.

7. In a photoelectric conversion system including a photomultiplier having an anode and dynodes, the combination with said system comprising means for producing in said photomultiplier an electron-carried anode current of sufficiently low value for the maximum light intensity used to limit the drift of said current from its initial stabilized value to at the most 2% during the first hour of operation following substantially full recovery of said photomultiplier from light fatigue, means for impressing on at least one dynode an alternating voltage signal of only one fundamental frequency for each dynode on which an alternating signal is impressed to produce by the signal so impressed and in the electron-carried anode current of said photomultiplier a variation having as a major component the second harmonic of said fundamental frequency, said voltage signal being substantially free of second harmonic, and band-pass filter means in circuit with said anode to pass signals at said second harmonic frequency along with side band frequencies thereof and to reject signals of other frequencies.

8. In a photoelectric conversion system including a photomultiplier having an anode and dynodes, the combination with said system comprising, means for impressing on at least one dynode an alternating signal with a content substantially entirely of a fundamental frequency component to thereby produce in the photomultiplier an electron-carried anode current varying as the second harmonic of said component, band-pass filter means in circuit with said anode and tuned to pass only said second harmonic and side bands thereof, and neutralizing means for supplying to said anode said fundamental frequency signal in an amount and phase to cancel with any of said signal reaching said anode by leakage paths between elements of said photomultiplier.

9. The method of operating a photomultiplier comprising, producing therein an electron carried anode current of sufficiently low value for the maximum light intensity used to limit the percentage drift of said current to a negligible amount during the first hour of operation following substantially full recovery of said photomultiplier from light fatigue; varying in opposite phase in an alternating manner and at only one fundamental frequency, free of second harmonic, the voltages in said photomultiplier of two adjacent electron-accelerating inter-electrode fields having substantially equal D. C. voltage components to reduce said field voltages alternately to at least zero value at times a half cycle apart in a voltage variation cycle, the said varying of said voltages producing a cyclical driving of said current through the maximum therefor obtainable from said voltages to produce in said current a variation having as a major component the second harmonic of said fundamental frequency, and filtering said current to pass signals of said half second harmonic frequency along with side band frequencies thereof and to reject signals of other frequencies.

References Cited in the file of this patent

UNITED STATES PATENTS

| | | |
|---|---|---|
| 2,172,324 | Schubert | Sept. 5, 1939 |
| 2,245,119 | Walton | June 10, 1941 |
| 2,342,986 | Van Den Bosch | Feb. 29, 1944 |
| 2,577,164 | Sziklai | Dec. 4, 1951 |
| 2,617,948 | Kallmann | Nov. 11, 1952 |
| 2,758,217 | Scherbatskoy | Aug. 7, 1956 |

FOREIGN PATENTS

| | | |
|---|---|---|
| 630,888 | Great Britain | Jan. 12, 1948 |